(12) United States Patent
Patrick et al.

(10) Patent No.: US 8,086,615 B2
(45) Date of Patent: Dec. 27, 2011

(54) SECURITY DATA REDACTION

(75) Inventors: Paul B. Patrick, Manchester, NH (US);
Naveen Gupta, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 290 days.

(21) Appl. No.: 11/341,836

(22) Filed: Jan. 27, 2006

(65) Prior Publication Data

US 2006/0277220 A1    Dec. 7, 2006

Related U.S. Application Data

(60) Provisional application No. 60/665,696, filed on Mar. 28, 2005.

(51) Int. Cl.
*A63F 9/24* (2006.01)

(52) U.S. Cl. .......................................... 707/754; 463/43

(58) Field of Classification Search .................. 707/999, 707/754; 463/43
See application file for complete search history.

(56) References Cited

U.S. PATENT DOCUMENTS

| | | | |
|---|---|---|---|
| 5,335,345 A | 8/1994 | Frieder et al. | |
| 5,481,700 A | 1/1996 | Thuraisingham | |
| 5,544,355 A | 8/1996 | Chaudhuri et al. | |
| 5,701,453 A | 12/1997 | Maloney et al. | |
| 5,764,973 A | 6/1998 | Lunceford | |
| 5,797,128 A | 8/1998 | Birnbaum | |
| 5,802,518 A * | 9/1998 | Karaev et al. | 707/9 |
| 5,826,268 A | 10/1998 | Schaefer et al. | |
| 5,872,928 A | 2/1999 | Lewis et al. | |
| 5,940,289 A | 8/1999 | Iwata | |
| 5,941,947 A | 8/1999 | Brown et al. | |
| 6,005,571 A | 12/1999 | Pachauri | |
| 6,023,510 A * | 2/2000 | Epstein | 705/74 |
| 6,052,531 A | 4/2000 | Waldin et al. | |
| 6,158,010 A | 12/2000 | Moriconi et al. | |
| 6,175,837 B1 | 1/2001 | Sharma et al. | |
| 6,178,505 B1 | 1/2001 | Schneider et al. | |
| 6,226,635 B1 | 5/2001 | Katariya | |
| 6,243,747 B1 | 6/2001 | Lewis et al. | |
| 6,256,741 B1 | 7/2001 | Stubblebine | |
| 6,292,900 B1 | 9/2001 | Ngo et al. | |

(Continued)

FOREIGN PATENT DOCUMENTS

EP    1684192    7/2006

(Continued)

OTHER PUBLICATIONS

Gennick, J., "SQL in, XML out," Oracle Magazine, May/Jun. 2003, pp. 1-5, http://www.oracle.com/technology/oramag/oracle/03-may/o33xml.html.

(Continued)

*Primary Examiner* — Omkar Deodhar
(74) *Attorney, Agent, or Firm* — Fliesler Meyer LLP

(57) ABSTRACT

In accordance with one embodiment of the present invention, there are provided mechanisms and methods for securing access to data. These mechanisms and methods for securing access to data make it possible for systems to have improved control over accesses to information by redacting responses made by services based upon access policies. Requestors may be users, proxies or automated entities. This ability of a system to redact responses to queries or requests for services in accordance with access policies makes it possible to attain improved security in computing systems over conventional access control mechanisms that control based upon privileges for accessing a file, an account, a storage device or a machine upon which the information is stored.

21 Claims, 10 Drawing Sheets

U.S. PATENT DOCUMENTS

| | | | |
|---|---|---|---|
| 6,321,336 B1 | 11/2001 | Applegate et al. | |
| 6,335,972 B1 | 1/2002 | Chandersekaran et al. | |
| 6,336,114 B1 | 1/2002 | Garrison | |
| 6,374,256 B1 | 4/2002 | Ng et al. | |
| 6,412,070 B1 | 6/2002 | Van Dyke et al. | |
| 6,466,932 B1 | 10/2002 | Dennis et al. | |
| 6,484,261 B1 | 11/2002 | Wiegel | |
| 6,505,188 B1 | 1/2003 | Ghazal et al. | |
| 6,510,513 B1 | 1/2003 | Danieli | |
| 6,539,380 B1 | 3/2003 | Moran | |
| 6,542,993 B1 | 4/2003 | Erfani | |
| 6,578,037 B1 | 6/2003 | Wong et al. | |
| 6,651,249 B2 | 11/2003 | Waldin et al. | |
| 6,658,432 B1 | 12/2003 | Alavi | |
| 6,715,077 B1 | 3/2004 | Vasudevan et al. | |
| 6,757,822 B1 | 6/2004 | Feiertag et al. | |
| 6,772,332 B1 | 8/2004 | Boebert et al. | |
| 6,792,537 B1 | 9/2004 | Liu et al. | |
| 6,801,229 B1 | 10/2004 | Tinkler | |
| 6,807,636 B2 | 10/2004 | Hartman et al. | |
| 6,820,082 B1 | 11/2004 | Cook et al. | |
| 6,823,362 B2 | 11/2004 | Eshghi | |
| 6,832,313 B1 | 12/2004 | Parker | |
| 6,854,035 B2 | 2/2005 | Dunham et al. | |
| 6,862,594 B1 | 3/2005 | Saulpaugh et al. | |
| 6,873,988 B2 | 3/2005 | Herrmann et al. | |
| 6,931,549 B1 | 8/2005 | Ananda | |
| 6,941,471 B2 | 9/2005 | Lin | |
| 6,970,445 B2 | 11/2005 | O'Neill et al. | |
| 6,978,379 B1 | 12/2005 | Goh | |
| 7,003,578 B2 | 2/2006 | Kanada et al. | |
| 7,080,224 B2 | 7/2006 | Soejima et al. | |
| 7,093,283 B1 | 8/2006 | Chen et al. | |
| 7,181,513 B1 | 2/2007 | Harada et al. | |
| 7,185,332 B1 | 2/2007 | Waldin et al. | |
| 7,216,125 B2 * | 5/2007 | Goodwin | 707/9 |
| 7,219,140 B2 | 5/2007 | Marl et al. | |
| 7,234,168 B2 | 6/2007 | Gupta et al. | |
| 7,257,597 B1 | 8/2007 | Pryce et al. | |
| 7,272,625 B1 | 9/2007 | Hannel et al. | |
| 7,293,010 B2 | 11/2007 | Angele et al. | |
| 7,293,080 B1 | 11/2007 | Clemm et al. | |
| 7,296,292 B2 | 11/2007 | Chang et al. | |
| 7,337,170 B2 | 2/2008 | Lee et al. | |
| 7,395,255 B2 | 7/2008 | Li | |
| 7,466,334 B1 | 12/2008 | Baba | |
| 2001/0007133 A1 | 7/2001 | Moriconi et al. | |
| 2001/0023421 A1 | 9/2001 | Numao | |
| 2002/0016777 A1 | 2/2002 | Seamons | |
| 2002/0073088 A1 * | 6/2002 | Beckmann et al. | 707/10 |
| 2002/0091975 A1 | 7/2002 | Redlich et al. | |
| 2002/0099699 A1 | 7/2002 | Kindo et al. | |
| 2002/0138726 A1 | 9/2002 | Sames et al. | |
| 2002/0166052 A1 | 11/2002 | Garg | |
| 2002/0169954 A1 | 11/2002 | Bandini et al. | |
| 2002/0169975 A1 | 11/2002 | Good | |
| 2002/0178119 A1 | 11/2002 | Griffin et al. | |
| 2003/0014394 A1 | 1/2003 | Fujiwara | |
| 2003/0084030 A1 | 5/2003 | Day et al. | |
| 2003/0093581 A1 | 5/2003 | Oliver et al. | |
| 2003/0097443 A1 | 5/2003 | Gillett | |
| 2003/0110073 A1 | 6/2003 | Briel | |
| 2003/0115484 A1 | 6/2003 | Moriconi et al. | |
| 2003/0126236 A1 | 7/2003 | Marl et al. | |
| 2003/0126464 A1 | 7/2003 | McDaniel et al. | |
| 2003/0131245 A1 | 7/2003 | Linderman | |
| 2003/0154401 A1 | 8/2003 | Hartman et al. | |
| 2003/0182577 A1 | 9/2003 | Mocek | |
| 2003/0204719 A1 | 10/2003 | Ben-Itzhak | |
| 2003/0212673 A1 | 11/2003 | Kadayam et al. | |
| 2003/0217033 A1 | 11/2003 | Sandler et al. | |
| 2003/0229501 A1 | 12/2003 | Copeland et al. | |
| 2003/0236782 A1 | 12/2003 | Wong et al. | |
| 2003/0236977 A1 | 12/2003 | Levas et al. | |
| 2004/0010719 A1 | 1/2004 | Daenen | |
| 2004/0034767 A1 | 2/2004 | Robinson et al. | |
| 2004/0034774 A1 | 2/2004 | Le Saint | |
| 2004/0044651 A1 | 3/2004 | Abdo | |
| 2004/0054675 A1 | 3/2004 | Li | |
| 2004/0088286 A1 * | 5/2004 | Hackleman et al. | 707/3 |
| 2004/0088313 A1 | 5/2004 | Torres | |
| 2004/0098606 A1 | 5/2004 | Tan | |
| 2004/0107360 A1 | 6/2004 | Herrmann et al. | |
| 2004/0139043 A1 | 7/2004 | Lei et al. | |
| 2004/0153451 A1 | 8/2004 | Phillips et al. | |
| 2004/0162905 A1 | 8/2004 | Griffin et al. | |
| 2004/0162906 A1 | 8/2004 | Griffin et al. | |
| 2004/0181537 A1 | 9/2004 | Chawla | |
| 2004/0215650 A1 | 10/2004 | Shaji et al. | |
| 2004/0225893 A1 | 11/2004 | Ng | |
| 2004/0236760 A1 | 11/2004 | Arkeketa et al. | |
| 2004/0243644 A1 | 12/2004 | Steere et al. | |
| 2004/0243824 A1 | 12/2004 | Jones | |
| 2004/0243835 A1 | 12/2004 | Terzos | |
| 2004/0267876 A1 | 12/2004 | Kakivaya et al. | |
| 2004/0268148 A1 | 12/2004 | Karjala et al. | |
| 2005/0027723 A1 | 2/2005 | Jones et al. | |
| 2005/0182949 A1 | 8/2005 | Phillips et al. | |
| 2005/0246338 A1 | 11/2005 | Bird | |
| 2005/0289144 A1 * | 12/2005 | Dettinger et al. | 707/9 |
| 2006/0106777 A1 | 5/2006 | Faunce et al. | |
| 2006/0155863 A1 | 7/2006 | Schmidt | |
| 2006/0167858 A1 | 7/2006 | Dennis et al. | |
| 2006/0179296 A1 | 8/2006 | Bartlett et al. | |
| 2006/0200463 A1 | 9/2006 | Dettinger et al. | |
| 2006/0224563 A1 | 10/2006 | Hanson et al. | |
| 2007/0038610 A1 | 2/2007 | Omoigui | |
| 2007/0245416 A1 | 10/2007 | Dickerson et al. | |
| 2009/0187964 A1 | 7/2009 | Kao et al. | |

FOREIGN PATENT DOCUMENTS

| | | |
|---|---|---|
| WO | WO 03098460 | 11/2003 |

OTHER PUBLICATIONS

Ryutov, T., Neuman, C., Kim, D., "Dynamic Authorization and Intrusion Response in Distributed Systems," DARPA, Apr. 2003, vol. 1, pp. 50-61.

Beatty, "Service Data Objects", IBM Corp. and BEA Systems, Inc., version 1.0, Nov. 2003, retrieved from http://ftpna2.bea.com/pub/downloads/commonj/Commonj-SDO-Specification-v1.0.pdf on Sep. 4, 2008.

Hasan et al., Open Issues in Parallel Query Optimization, SIGMOD Record, vol. 25, No. 3, Sep. 1996, pp. 28-33.

Oracle Corporation, Oracle8i Concepts, Release 8.1.5, Optimization of Joins [http://web.archive.org/web/20040914100026/http://www.camden.rutgers.edu/HELP/Documentation/Oracle/server.815/a67781/c20c_joi.htm], Aug. 18, 2009, 17 pages.

International Search Report for PCT/US06/10451, dated Oct. 19, 2007, 8 pages.

Office Action dated Apr. 30, 2009 in connection with U.S. Appl. No. 11/222,280, filed Sep. 8, 2005 (21 pages).

Foldoc, Dictionary Definition: "API", dated Feb. 1995, retrieved from <http://foldoc.org/>.

Webopedia.com. Dictionary Definition: "API", retrieved Oct. 2008, retrieved from <http://www.webopedia.com/TERM/A/API.html>.

Issarny et al. "Software Architecture for Mobile Distributed Computing", Software Architecture, 2004, WICSA 2004, Proceedings, Fourth Working IEEE/IFIP Conference on Jun. 12-15, 2004, pp. 201-210.

Chun-Hsian et al. "UML Based Hardware/Software Co-Design Platform for Dynamically Partially Reconfigurable Network Security Systems", Computer Systems Architecture Conference, 2008, ACSAC 2008, 13.sup.th Asia-Pacific, Aug. 4-6, 2008, pp. 1-8.

Liu et al. "Active Security Support for Active Networks" Systems, Man, and Cybernetics, Part C: Applications and Reviews, IEEE Transactions on vol. 33, Issue 4, Nov. 2003 pp. 432-435.

Office Action dated Sep. 29, 2009 in connection with U.S. Appl. No. 11/222,287, filed Sep. 8, 2005 (22 pages).

* cited by examiner

```
<Title>Suspects</eTitle>
    < Security_Level>Green</Security_Level>    /402
    <body>
        <Suspect>
            <Name>John Doe</Name>    /404
        <Address>123 SideStreet, Anytown</Address>
            <Convictions>
                disorderly conduct: 1980    /406
            </Convictions>
        < Security_Level>Yellow</Security_Level>    /408
            <Arrests>
                robbery: 1990    /410
            </Arrests>
        < Security_Level>Red</Security_Level>    /412
            <Juvenile_Record>
                shoplifting: 1970
            </Juvenile_Record>    /414
        </Suspect>
    < Security_Level>Green</Security_Level>    /416
        <Suspect>
        </Suspect>
    </body>
```

Fig. 4A

```
<Title>Stocks</eTitle>                          422
    <Market_Activity_Level>High</Market_Activity_Level>
    <body>
        <Stock>                              424
            <Name>Int'l Sardine</Name>
            <Symbol>IS</Symbol>
            <Last>85.10</Last>               426
                                             428
        <Market_Activity_Level>Med</Market_Activity_Level>
            <High>86.25</High>   430
            <Low>84.75</Low>
                                             432
        < Market_Activity_Level>Low</Market_Activity_Level>
            <Volume>1,500M</Volume>    434
        </Stock>

<Stock>
        </Stock>

</body>
```

*Fig. 4B*

SECURITY DATA REDACTION

CLAIM TO PRIORITY

The present application claims the benefit of:

U.S. Patent Application No. 60/665,696, entitled SECURITY DATA REDACTION, by Paul Patrick and Naveen Gupta, filed Mar. 28, 2005.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Cross Reference To Related Applications

The following commonly owned, co-pending United States Patents and Patent Applications, including the present application, are related to each other. Each of the other patents/applications are incorporated by reference herein in its entirety:

United States Provisional Patent Application No. 60/665,908 entitled "LIQUID DATA SERVICES," filed on Mar. 28, 2005;

United States Provisional Patent Application No. 60/666,079 entitled "MODELING FOR DATA SERVICES," filed on Mar. 29, 2005;

United States Provisional Patent Application No. 60/665,768 entitled "USING QUERY PLANS FOR BUILDING AND PERFORMANCE TUNING SERVICES," filed on Mar. 28, 2005;

United States Provisional Patent Application No. 60/665,696 entitled "SECURITY DATA REDACTION," filed on Mar. 28, 2005;

United States Provisional Patent Application No. 60/665,667 entitled "DATA REDACTION POLICIES," filed on Mar. 28, 2005;

United States Provisional Patent Application No. 60/665,944 entitled "SMART SERVICES," filed on Mar. 29, 2005;

United States Provisional Patent Application No. 60/665,943 entitled "AD HOC QUERIES FOR SERVICES," filed on Mar. 29, 2005; and United States Provisional Patent Application No. 60/665,964 entitled "SQL INTERFACE FOR SERVICES," filed on Mar. 29, 2005.

FIELD OF THE INVENTION

The current invention relates generally to securing access to data, and more particularly to a mechanism for security data redaction.

BACKGROUND

Increasingly, enterprises are looking for ways to simplify access and organization of Information Technology (IT) services. One mechanism for providing such IT simplification is Service Oriented Architecture (SOA). Application of SOA principles promises faster development cycles, increased reusability and better change tolerance for software components.

Unfortunately, enterprises that implement SOA often find that the start-up complexities of SOA delays, if not derails, the expected return on investment. While SOA simplifies the complexity of an IT environment, organizations lack sufficient experience with SOA technology required for a quick, trouble-free implementation. Compounding this experience gap, graphical tools for implementing SOA are not readily available, so that data services for use in SOA environments often must be hand-coded. For enterprise-class portal and Web applications, for example, a majority of application development time can be spent on managing data access. A number of factors make data programming difficult and time-consuming, including data access control. Accordingly, there exists a continued need for improved mechanisms for security data redaction in implementing SOA type initiatives.

One problem that arises is controlling access to data by different individuals. One conventional approach includes controlling individual's access to data storage constructs, i.e., files, databases and so forth, using a scheme of access permissions. For example, a user may be granted some combination of read, write, modify and delete authority for a particular file, database or other data storage construct. Such conventional approaches, however, require the user to be cleared for the entire content of the data storage construct.

Another conventional approach includes controlling access to the services by individuals. A problem with such approaches, however, arises from the coarseness of the approaches' granularity—an individual is either permitted to use the service or denied access to the service. Some implementations have sought to ameliorate this drawback by establishing classes of access, i.e., user, administrator and so forth, each class having access to a specific set of functions in the service. Each of these conventional approaches, however, suffers the same limitation—an individual granted access to the service, or the data storage construct, has access to the entirety of the data.

BRIEF DESCRIPTION OF THE DRAWINGS

FIGS. 4A-4B are diagrams illustrating a high level overview of example service output data corresponding to the examples illustrated in FIGS. 3A-3B.

DETAILED DESCRIPTION

Figure 1A:
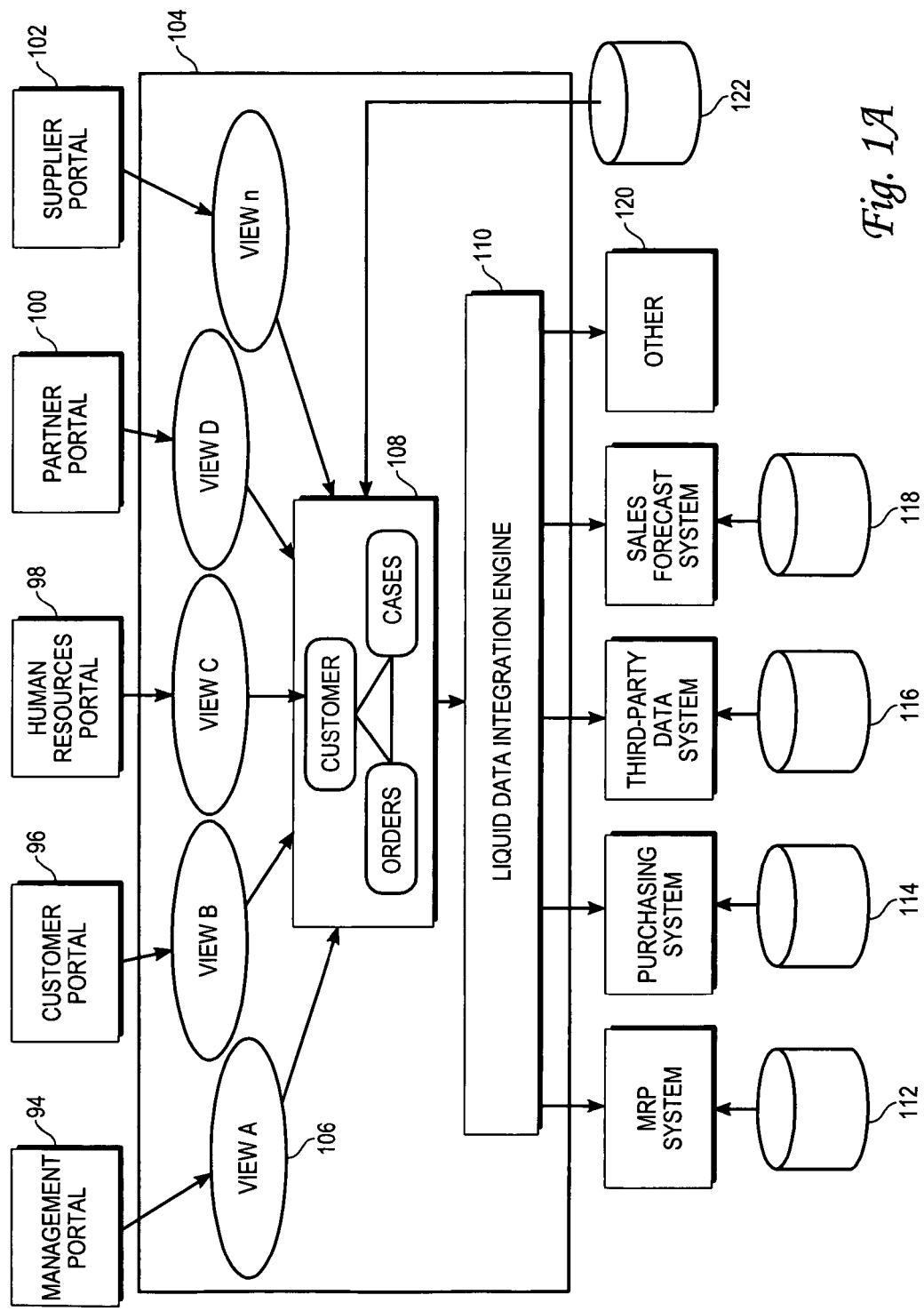
FIGS. 1A-1B are functional block diagrams illustrating an example computing environment in which techniques for data redaction may be implemented in one embodiment.

In accordance with embodiments of the present invention, there are provided mechanisms and methods for securing access to data. These mechanisms and methods for securing access to data make it possible for systems to have improved control over accesses to information by redacting responses made by services. In an example embodiment, redaction is based upon access policies associated with a requester. Requestors may be users, proxies or automated entities. This ability of a system to redact responses to queries or requests from services in accordance with access policies or the like makes it possible to attain improved security in computing systems over conventional access control mechanisms that control based upon privileges to access a file, an account, a storage device or a machine upon which the information is stored. In other example embodiments, access to information may be controlled in accordance with access policies based upon any quantity, indication or other detectable state with which dissemination of information can be coordinated, including without limitation, market activity, severity of weather, seriousness of infractions on a criminal record, member status in a shopping club and the like.

In one embodiment, a method for securing access to data is provided. The method includes accessing at least one service on behalf of a requestor. A result set is received from the at least one service. Only that portion of the result set that the requestor is permitted to access is provided to the requestor. A Liquid Data framework, for example, can map the portion of the result set provided to the requestor to a view associated with the requestor. The result set received from the service or services may be redacted in accordance with access policies, if the policy permits the requestor to access only a portion of the result set, or can be provided in its entirety if the policy permits the requestor to access all of the result set or may be blocked entirely if the policy does not permit the requestor to access any of the result set.

While the present invention is described herein with reference to example embodiments for controlling access to data using data redaction based upon access policies associated with the requestor, the present invention is not so limited, and in fact, the access control techniques provided by embodiments of the present invention are broadly applicable to a wide variety of situations in which control over information dissemination is desirable. By way of example, and not intended to be limiting, various embodiments can provide: less personal information about juvenile offenders than adults; less detailed information about each trade when market trading volume increases; more detailed weather information when the weather is hazardous to travel; more special product offerings to members having premium status with shopping clubs than regular members; more detailed criminal record information for suspected felons than for individuals with less serious infractions in their criminal record; and so forth.

As used herein, the term service is intended to be broadly construed to include any application, program or process resident on one or more computing devices capable of providing services to a requestor or other recipient, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. The term result set is intended to be broadly construed to include any result provided by one or more services. Result sets may include multiple entries into a single document, file, communication or other data construct. As used herein, the term view is intended to be broadly construed to include any mechanism that provides a presentation of data and/or services in a format suited for a particular application, service, client or process. The presentation may be virtualized, filtered, molded, or shaped. For example, data returned by services to a particular application (or other service acting as a requester or client) can be mapped to a view associated with that application (or service). Embodiments can provide multiple views of available services to enable organizations to compartmentalize or streamline access to services, increasing the security of the organization's IT infrastructure.

Access policies (or "authorization policies", "security policies" or "policies") dynamically identify resources (e.g., J2EE resources, an XML document, a section of an XML document, services, information returned by services, etc.) for which access is controlled, entities allowed to access each resource, and constraints that apply to each requestor or group of requestors that attempt to access the resource. A policy can be based on role(s) such that it determines which role(s) are permitted to access a resource under certain conditions. (In various embodiments, roles can be defined to dynamically associate users and/or groups of users based on some criteria. For example, a system administrator role might include all users having a certain skill level and only during certain times of day (e.g., after 5:00 pm)).

In one embodiment, a policy can be specified as follows (wherein items in square brackets indicate alternatives; italic font indicates optional items):

[GRANT, DENY] (action, resource, subject) IF (constraint condition)1 . . . IF (constraint condition)N;

Where:

GRANT permits a specified action. DENY revokes it;

Action is the name of a resource or resource attribute to grant or deny access to;

Resource is the name of the resource that this policy will be associated with;

Subject is the name of one or more users, groups and/or roles that are granted/denied the action. A special subject called any denotes that any user, group and role is potentially a subject; and IF (constraint condition) is one or more optional conditions placed on the action. Conditions can include one or more arithmetic and logical functions and expressions involving attributes of resources or other entities in the system, such as requestor attributes, group membership, dynamic attributes (e.g., time, date, location), and other suitable information.

Figure 1B:
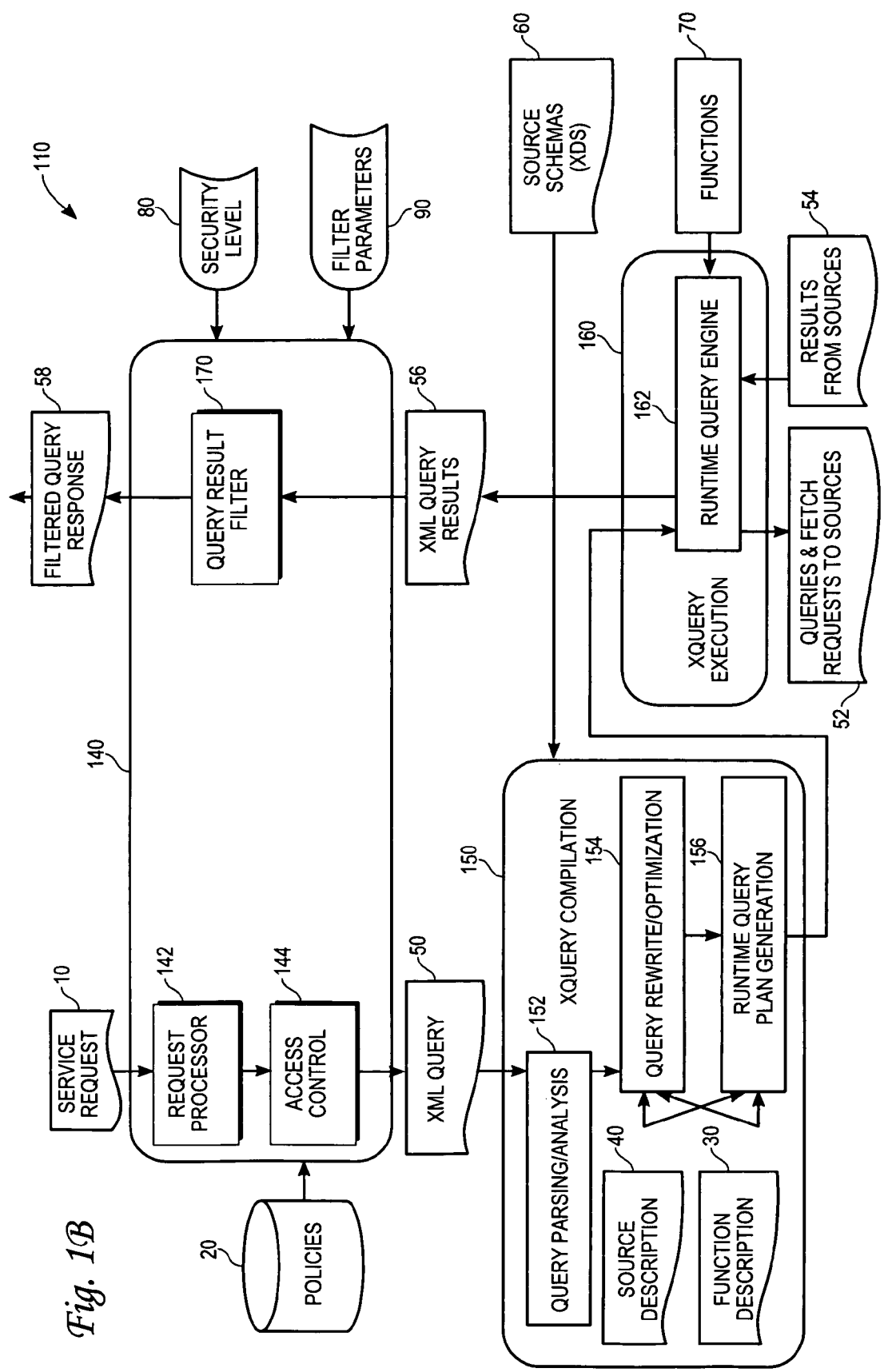

FIGS. 1A-1B are functional block diagrams illustrating an example computing environment in which techniques for data redaction may be implemented in one embodiment. As shown in FIG. 1A, a liquid data framework 104 is used to provide a mechanism by which a set of applications, or application portals 94, 96, 98, 100 and 102, can integrate with, or otherwise access in a tightly couple manner, a plurality of services. Such services may include a Materials Requirements and Planning (MRP) system 112, a purchasing system 114, a third-party relational database system 116, a sales forecast system 118 and a variety of other data-related services 120. Although not shown in FIG. 1A for clarity, in one embodiment, one or more of the services may interact with one or more other services through the liquid data framework 104 as well.

Internally, the liquid data framework 104 employs a liquid data integration engine 110 to process requests from the set of portals to the services. The liquid data integration engine 110 allows access to a wide variety of services, including data storage services, server-based or peer-based applications, Web services and other services capable of being delivered by one or more computational devices are contemplated in various embodiments. A services model 108 provides a structured view of the available services to the application portals 94, 96, 98, 100 and 102. In one embodiment, the services model 108 provides a plurality of views 106 that may be filtered, molded, or shaped views of data and/or services into a format specifically suited for each portal application 94, 96, 98, 100 and 102. In one embodiment, data returned by services to a particular application (or other service acting as a requestor or client) is mapped to the view 106 associated with that application (or service) by liquid data framework 104. Embodiments providing multiple views of available services can enable organizations to compartmentalize or streamline access to services, thereby increasing the security of the organization's IT infrastructure. In one embodiment, services model 108 may be stored in a repository 122 of service models. Embodiments providing multiple services models can enable organizations to increase the flexibility in changing or adapting the organization's IT infrastructure by lessening dependence on service implementations.

FIG. 1B is a high level schematic of a liquid data integration engine 110 illustrated in FIG. 1A with reference to one example embodiment. As shown in FIG. 1B, the liquid data integration engine 110 includes an interface processing layer 140, a query compilation layer 150 and a query execution layer 160. The interface layer 140 includes a request processor 142, which takes the request 10 and processes this request into an XML query 50. Interface layer 140 also includes access control mechanism 144, which determines based upon a plurality of policies 20 whether the client, portal application, service or other process making the request 10 is authorized to access the resources and services required to satisfy the request. Provided that the client, application, service or other process is authorized to make the request 10, the interface layer sends the XML query 50 to the query compilation layer 150.

Within the query compilation layer 150, a query parsing and analysis mechanism 152 receives the query 50 from the client applications, parses the query and sends the results of the parsing to a query rewrite optimizer 154. The query rewrite optimizer 154 determines whether the query can be rewritten in order to improve performance of servicing the query based upon one or more of execution time, resource use, efficiency or other performance criteria. The query rewrite optimizer 154 may rewrite or reformat the query based upon input from one or more of a source description 40 and a function description 30 if it is determined that performance may be enhanced by doing so. A runtime query plan generator 156 generates a query plan for the query provided by the query rewrite optimizer 154 based upon input from one or more of the source description 40 and the function description 30.

The query compilation layer 150 passes the query plan output from the runtime query plan generator 156 to a runtime query engine 162 in the query execution layer 160. The runtime query engine 162 is coupled with one or more functions 70 that may be used in conjunction with formulating queries and fetch requests to sources 52, which are passed on to the appropriate service(s). The service responds to the queries and fetch requests 52 with results from sources 54. The runtime query engine 162 of the query execution layer 160 translates the results into a format usable by the client or portal application, such as without limitation XML, in order to form the XML query results 56.

Before responses or results 56 are passed back to the client or portal application making the request, a query result filter 146 in the interface layer 140 determines based upon filter parameters 90 what portion of the results will be passed back to the client or portal application, forming a filtered query response 58. Although not shown in FIG. 1B for clarity, filter parameters 90 may accompany service request 10 in one embodiment. Further, query result filter 146 also determines based upon access policies implementing security levels 80 what portions of the filtered query response 58 a requestor is permitted to access and may redact the filtered query response accordingly. Although not shown in FIG. 1B for clarity, access policies implementing security levels 80 may be stored with policies 20 in one embodiment. Techniques for providing a requestor with only that portion of the information that the requestor is permitted access based upon a policy implemented by query result filter 170 will be described below in greater detail with reference to FIGS. 2A-2C. When properly formed, the response is returned to the calling client or portal application.

Figure 2A:
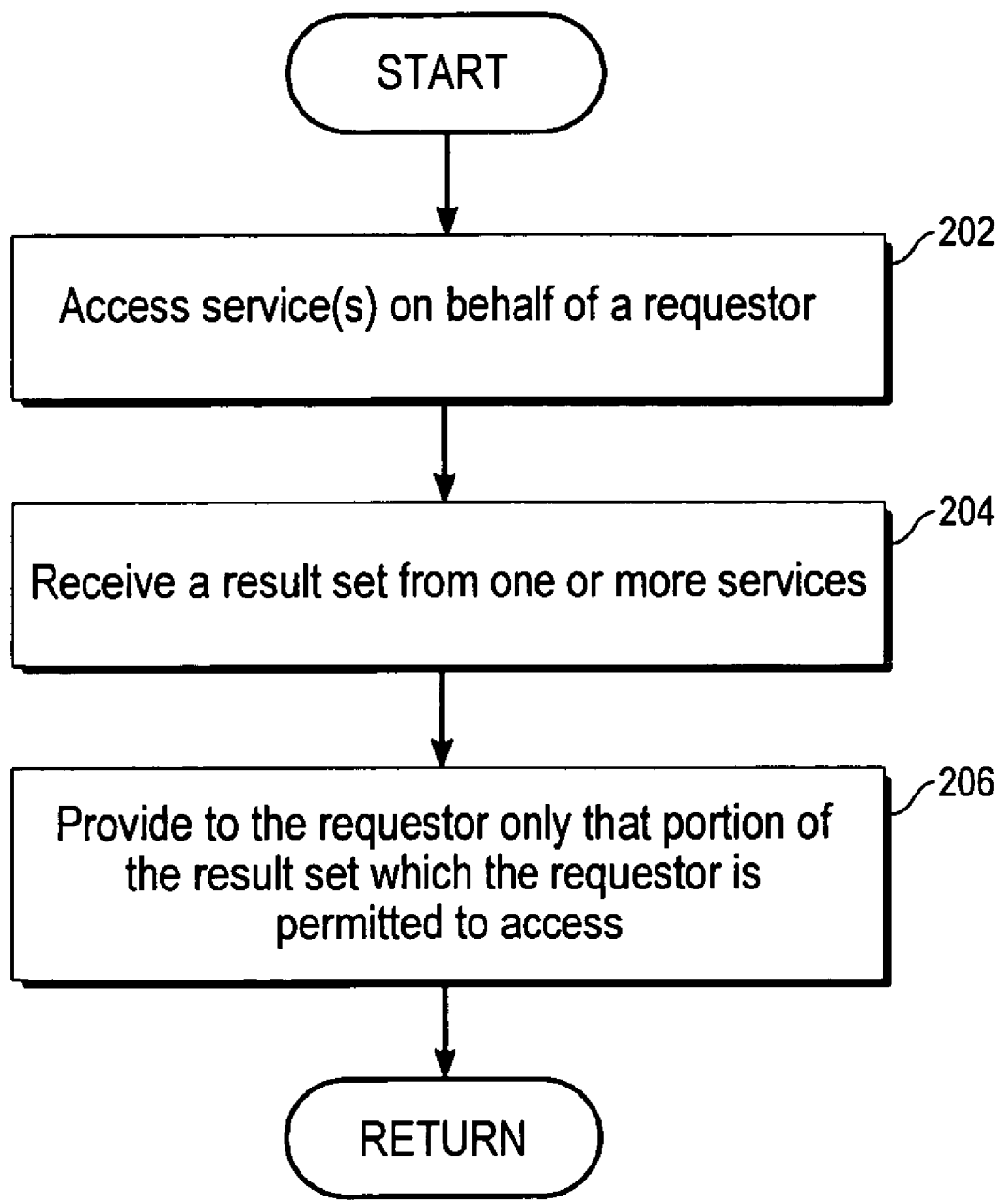
FIG. 2A is an operational flow diagram illustrating a high level overview of a technique for securing access to data of one embodiment of the present invention.

FIG. 2A is an operational flow diagram illustrating a high level overview of a technique for securing access to data of one embodiment of the present invention. The technique for securing access to data shown in FIG. 2A is operable with an application sending data, such as Materials Requirements and Planning (MRP) system 112, an purchasing system 114, a third-party relational database system 116, sales forecast system 118, or a variety of other data-related services 120 of FIG. 1A, for example. As shown in FIG. 2A, at least one service is accessed on behalf of a requester (block 202). A result set is received from one or more services (block 204). Only that portion of the result set that the requester is permitted to access is provided to the requestor (block 206). Liquid data framework 104 can map the portion of the result set provided to the requestor to a view associated with the requestor. In one embodiment, the method illustrated by blocks 202-206 may be advantageously disposed in the interface processing layer 140, query compilation layer 150 and query execution layer 160 of FIG. 1B.

Figure 2B:
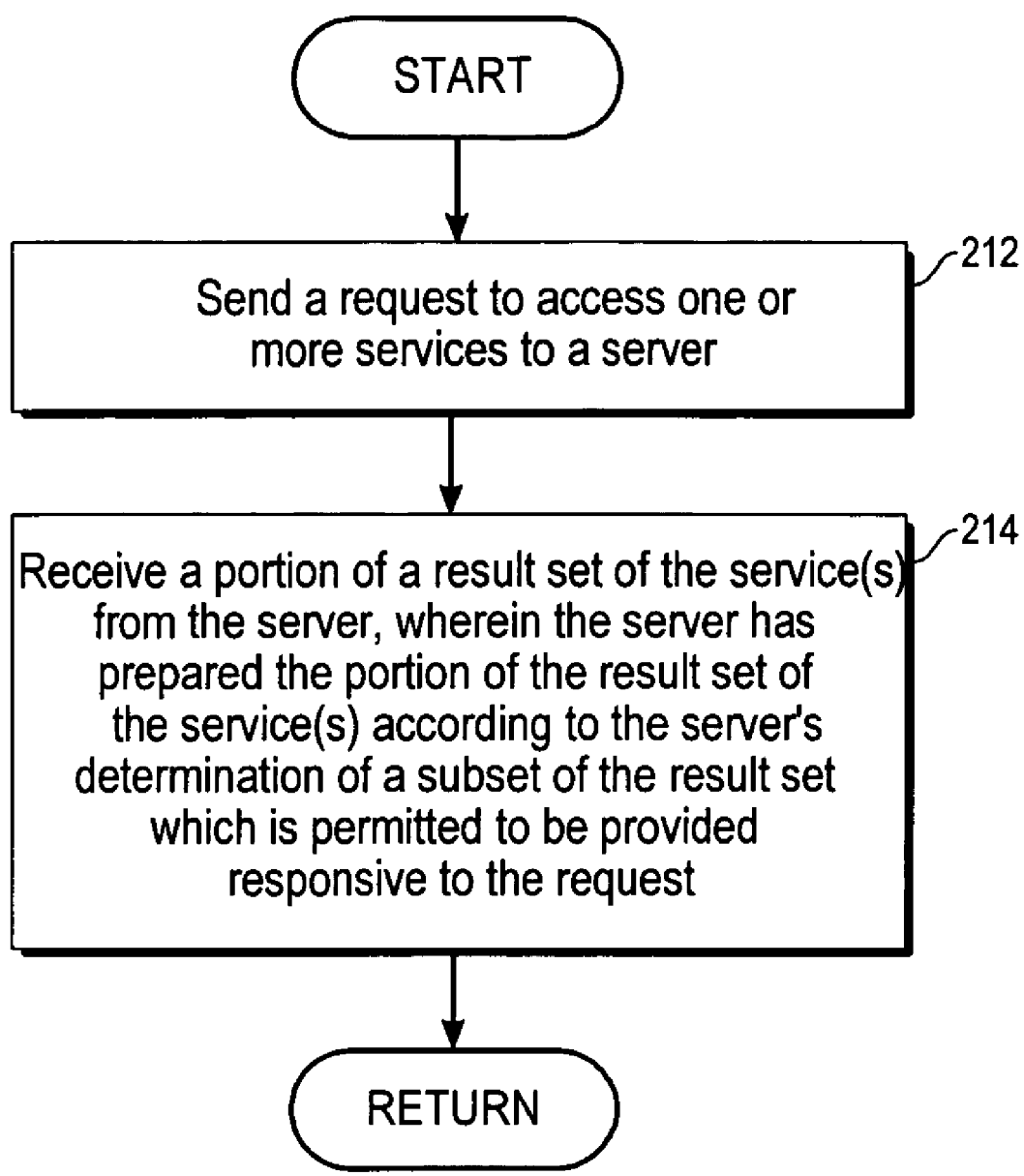
FIG. 2B is an operational flow diagram illustrating a high level overview of a technique for receiving data under a secured environment of one embodiment of the present invention.

FIG. 2B is an operational flow diagram illustrating a high level overview of a technique for receiving data under a secured environment of one embodiment of the present invention. The technique for receiving data under a secured environment shown in FIG. 2B is operable with an application sending data, such as applications 94, 96, 98, 100 and 102 of FIG. 1A, for example or a service, such as Materials Requirements and Planning (MRP) system 112, an purchasing system 114, a third-party relational database system 116, sales forecast system 118, or a variety of other data-related services 120 of FIG. 1A. As shown in FIG. 2B, a request to access one or more services is sent to a server (block 212). A portion of a result set of the service(s) is received (block 214) from the server. The server has prepared the portion of the result set of the service(s) according to the server's determination of a subset of the result set that is permitted to be provided responsive to the request.

Figure 2C:
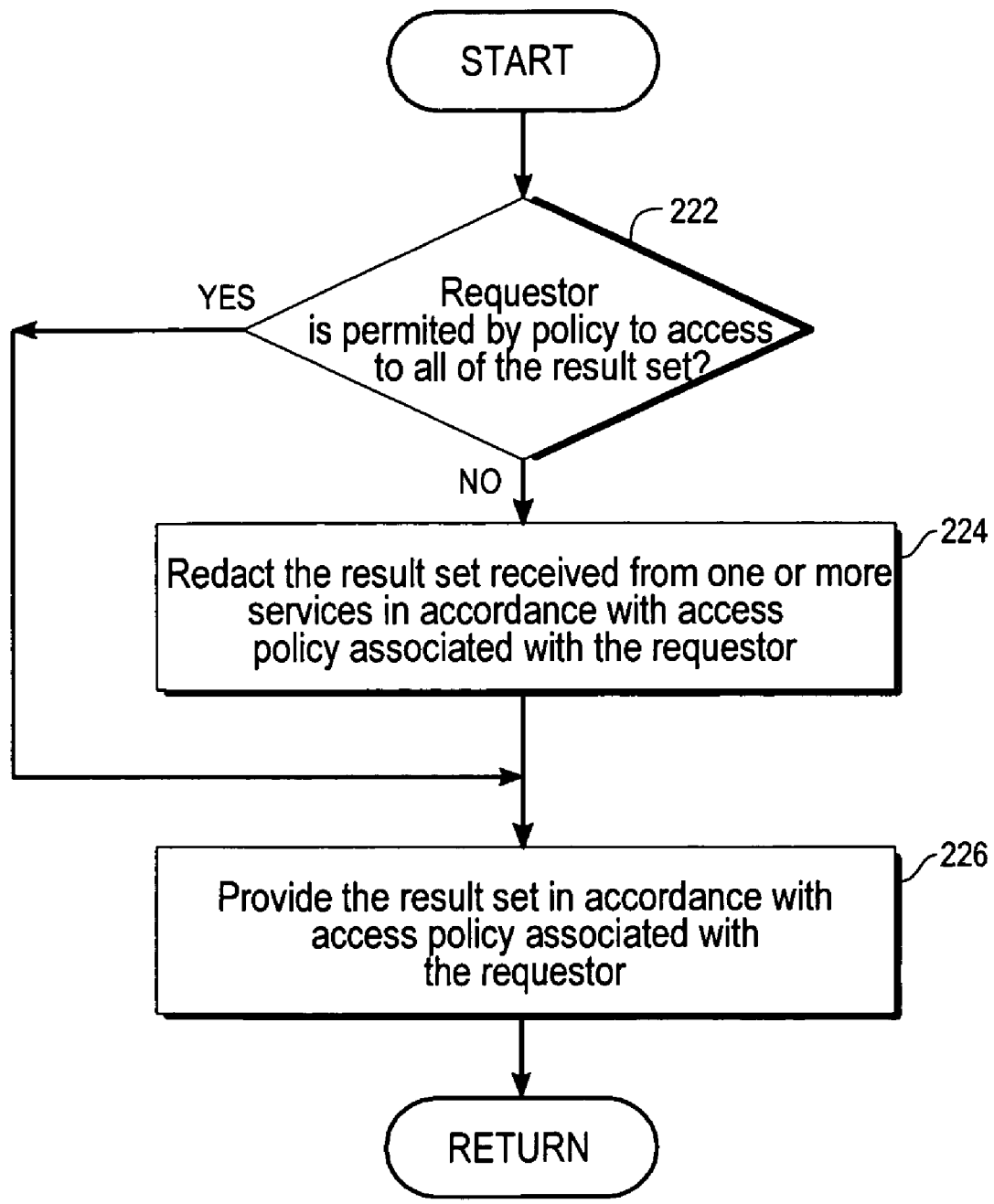
FIG. 2C is an operational flow diagram of an example redaction based technique for securing data, which may be used in conjunction with the technique illustrated in FIG. 2A.

FIG. 2C is an operational flow diagram of an example redaction based technique for securing data, which may be used in conjunction with the technique illustrated in FIG. 2A. As shown in FIG. 2C, whether the requestor has a policy has a policy associated with it that permits access to all of the result set is determined (block 222). If not, then the result set received from the service is redacted in accordance with access policies associated with the requester (block 224). In any event, the result set is then provided in accordance with the access policies associated with the requestor (block 226).

Some of the features and benefits of the present invention will be illustrated with reference to FIGS. 3A-3B, which are operational flow diagrams illustrating some example embodiments implementing example applications. FIGS. 4A-4B are diagrams illustrating example service output data corresponding to the examples illustrated in FIGS. 3A-3B. The reader will appreciate that these examples are for illustrative purposes only and not intended to be limiting.

Figure 3A:
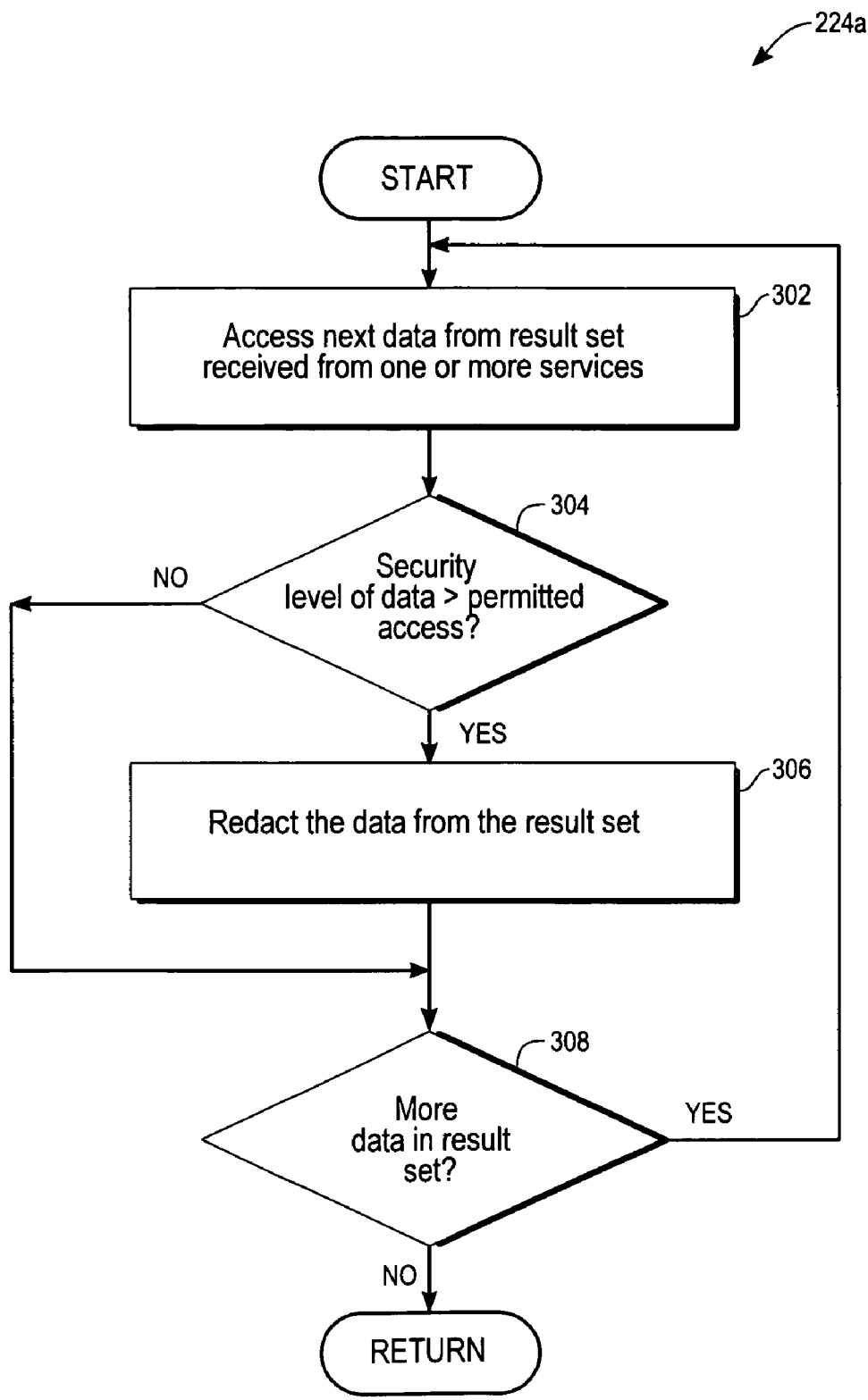
FIGS. 3A-3B are operational flow diagrams illustrating a high level overview of examples of data redaction techniques in various embodiments of the present invention.

In a first example, an embodiment employing processing illustrated by FIG. 3A controls access to information based upon a policy by comparing a security level associated with the information and a requestor's permitted access. When used in conjunction with example service output information illustrated by FIG. 4A, which is the input to the processing of FIG. 3A, the embodiment illustrated by FIG. 3A enables access to more sensitive information about suspected violators to be restricted to requestors granted greater authority by access policies. As shown in FIG. 3A, data is accessed from the result set received from one or more services (block 302). If the security level associated with the data is greater than the requestor's permitted access (block 304), then the data is redacted (block 306) from the result set. Otherwise, the data remains in the result set. If more data is to be processed (block 308), more data is accessed (block 302).

In the example service output data illustrated by FIG. 4A, the result set 400a output by a service includes an indication of security level 402. The security level indication 402 indicates that the information following the indicator is accessible to a requestor having access under a policy that includes at least "green" level information. As shown in FIG. 4A, result set 400a includes data for various suspects, including data corresponding to a first suspect, "John Doe." The data for the first suspect includes information about the suspect beginning with a name and address 404. Since the security level was set to "green" by security level indication 402, the suspect name and address 404 are accessible to requestors permitted by an access policy to access at least "green" level information. A conviction record 406 is also available to requestors permitted access to at least "green" level by an access policy.

A second security level indication 408 indicates that subsequent information requires an access policy permitting access to at least "yellow". Thus, the arrests data 410 requires requesters to be permitted by access policies to access at least "yellow" level information in order to view this information. A third security level indication 412 indicates that subsequent information requires an access policy permitting access to at least "red", requiring even further permission to access the juvenile record data block 414. A fourth security level indication 416 returns the security level back to "green". Thus, information that is restricted by court order and information that is highly prejudicial to a suspect may be included in the same document 400a with information suitable for general access. In this manner, access policies permitting greater access permissions may be required in order to view more sensitive information even though the information is included in the same document 400a in the illustrated embodiment. While colors are used as indicators to demonstrate the functioning of this embodiment, the present invention is not limited to using colors as security level indicators.

Turning again to FIG. 3A, the security level associated with each data 404, 406, 410 and 414 is compared to the requestor's permitted access policy security level (block 304), and redacted (block 306) from the result set if the requestor does not have sufficient access for that particular data. Accordingly, in the foregoing example, as the requestor's access level increases, the amount of information available to the requestor also increases. In the next example, a reduction in the amount of information available to the requester as market activity increases is effected using policies keyed to market activity.

Figure 3B:
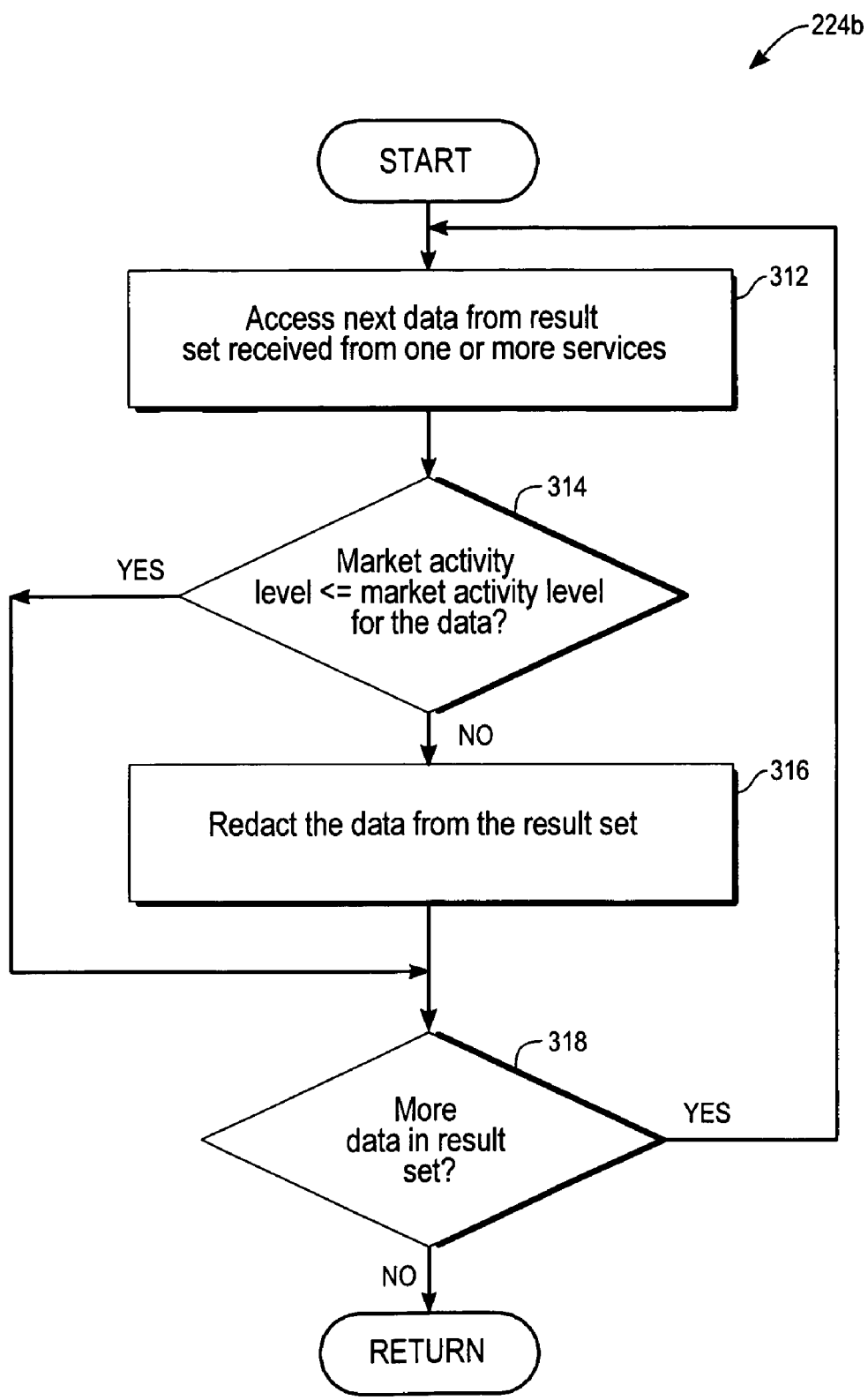

In a second example, an embodiment employing processing illustrated by FIG. 3B controls access to information based upon a policy by comparing a market activity level associated with the information and a present market activity. When used in conjunction with example service output information illustrated by FIG. 4B, which is the input to the processing of FIG. 3B, the embodiment illustrated by FIG. 3B enables access to less information about a stock to as the trading activity level of the market increases. As shown in FIG. 3B, data is accessed from the result set received from one or more services (block 312). If the present market activity level is less than or equal to the market activity level associated with the data (block 314), then no further action is taken and the data remains in the result set. Otherwise, the data is redacted (block 316) from the result set. If more data is to be processed (block 318), then more data is accessed (block 312).

In the example output data illustrated by FIG. 4B, the result set 400b includes an indication of market activity level 422. The market activity level 422 indicates that the information is accessible to any requestor even when the market activity is "high". As shown in FIG. 4B, result set 400b includes data for various stocks, such as data corresponding to a first stock. The data for the first stock includes information about the stock beginning with a name and "ticker" symbol 424. Since the market activity level is set to "high" by market activity level indication 422, the name and symbol 424 are accessible to users even when the market activity level is high. A last trade price 426 is also available to users at any time. A second market activity level indication 428 indicates that subsequent information requires a market activity of at least "med" to be redacted. Thus, the high and low price data block 430 will be shown if the market activity level is less than "med". A third market activity level indication 432 indicates that subsequent information about trading volume is included (i.e., not redacted) if market activity is less than "low", requiring an even slower trading day for the contents of volume data block 434 to be displayed. In this manner, successively greater amounts of information may be omitted when trading volume increases even though the information is included in the same document 400b in the illustrated embodiment.

Turning again to FIG. 3B, the market activity level associated with each data 424, 426, 430 and 434 is compared to the present market activity level (block 314), and redacted (block 316) from the result set if the market activity level equals or exceeds the indicated maximum market activity level for that data. Accordingly, in the foregoing example, as the market's activity level increases, the amount of information available to the requestor decreases.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for securing data as discussed herein.

Figure 5:
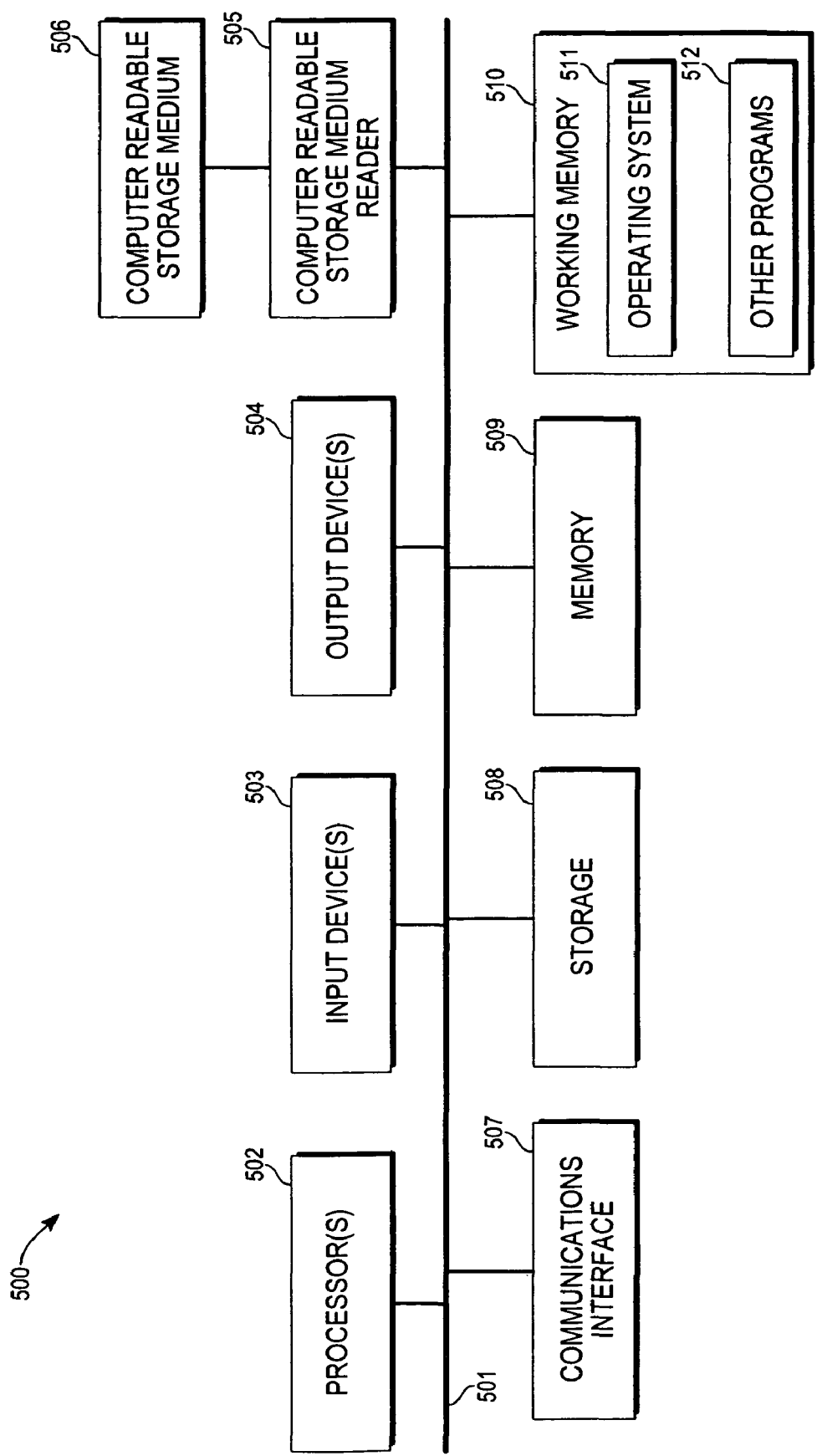
FIG. 5 is a hardware block diagram of an example computer system, which may be used to embody one or more components of an embodiment of the present invention.

FIG. 5 illustrates an exemplary processing system 500, which can comprise one or more of the elements of FIGS. 1A and 1B. Turning now to FIG. 5, an exemplary computing system is illustrated that may comprise one or more of the components of FIGS. 1A and 1B. While other alternatives might be utilized, it will be presumed for clarity sake that components of the systems of FIGS. 1A and 1B are implemented in hardware, software or some combination by one or more computing systems consistent therewith, unless otherwise indicated.

Computing system 500 comprises components coupled via one or more communication channels (e.g., bus 501) including one or more general or special purpose processors 502, such as a Pentium®, Centrino®, Power PC®, digital signal processor ("DSP"), and so on. System 500 components also include one or more input devices 503 (such as a mouse, keyboard, microphone, pen, and so on), and one or more output devices 504, such as a suitable display, speakers, actuators, and so on, in accordance with a particular application. (It will be appreciated that input or output devices can also similarly include more specialized devices or hardware/software device enhancements suitable for use by the mentally or physically challenged.)

System 500 also includes a computer readable storage media reader 505 coupled to a computer readable storage medium 506, such as a storage/memory device or hard or removable storage/memory media; such devices or media are further indicated separately as storage 508 and memory 509, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 507 may also be included, such as a modem, DSL, infrared, RF or other suitable transceiver, and so on for providing inter-device communication directly or via one or more suitable private or public networks or other components that may include but are not limited to those already discussed.

Working memory 510 further includes operating system ("OS") 511 elements and other programs 512, such as one or more of application programs, mobile code, data, and so on for implementing system 500 components that might be stored or loaded therein during use. The particular OS or OSs may vary in accordance with a particular device, features or other aspects in accordance with a particular application (e.g. Windows, WindowsCE, Mac, Linux, Unix or Palm OS variants, a cell phone OS, a proprietary OS, Symbian, and so on). Various programming languages or other tools can also be utilized, such as those compatible with C variants (e.g., C++, C#), the Java 2 Platform, Enterprise Edition ("J2EE") or other programming languages in accordance with the requirements of a particular application. Other programs 512 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 508 or memory 509) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for securing access to data, the method comprising:
  receiving a request from a requestor to access a plurality of data access services, said request associated with a service model, and said request including filter parameters
    wherein the service model provides a plurality of structured views of data in a format specific to the requestor, and wherein data returned to the requestor is mapped to one of the plurality of structured views associated with the requestor, and
    wherein the filter parameters accompany the request and determine the data included in a result set;
  accessing an authorization policy upon receiving the request to identify which of the plurality of data access services are available to the requestor, wherein the authorization policy includes one or more rules that are used to permit access to the plurality of data access services based on the requestor;
  accessing, based on the requestor, the plurality of data access services for which access is permitted by the authorization policy;
  receiving a combined filtered result set, the combined result set including the results from accessing the plurality of data access services, wherein the results from each of the plurality of data access services is filtered based on the filter parameters, and wherein each portion of the combined filtered result set is assigned a minimum level of access required to access the portion;

determining a level of access assigned to the requestor;

inspecting the combined filtered result set and determining, for each portion of the combined filtered result set, whether the requestor is permitted to access said portion of the combined filtered result set by comparing the minimum level of access associated with each portion in the combined filtered result set with the requestor's level of access;

redacting said portion from the combined filtered result set if the requestor is not permitted by the level of access to access said portion of the combined filtered result set, wherein said redacting is performed after the combined filtered result set is received from the plurality of data access services;

retaining said portion within the combined filtered result set if the requestor is permitted to access said portion of the combined filtered result set based on the level of access assigned to the requestor;

presenting to the requestor at least one of the plurality of structured views of the combined filtered result set, wherein each portion that is not permitted to be accessed by the requestor is redacted from the result set, and wherein the at least one of the plurality of different views presented is based upon a determination of which of the plurality of data access services are relevant to the requestor.

2. The method of claim 1, wherein providing access to the result set further comprises:

providing the result set according to access policies if the requestor is permitted by the access policies to access only a portion of the result set.

3. The method of claim 1, further comprising:

determining whether the requestor is making an authorized request to access datasets that the plurality of data access services access.

4. The method of claim 1, wherein service includes at least one of a network based application, a web server resident application, a web portal, a search engine, a photographic, audio or video information storage application, an e-Commerce application, a backup application, a storage application, a sales/revenue planning, marketing, forecasting, accounting, inventory management application.

5. The method of claim 1, further comprising:

determining a portion of the result set to be passed back to the requestor based on filter parameters accompanying with a request to access the plurality of data access services from the requestor.

6. The method of claim 1, further comprising:

reformatting queries to improve performance based on execution time, resource use, efficiency and other performance criteria.

7. The method of claim 1, further comprising:

comparing a security level associated with information in the result set received from the plurality of data access services and the requestor's permitted access policy security level.

8. The method of claim 1, further comprising:

mapping the result set into a special format suited for the requestor, wherein the special format is one of a plurality of formats, and wherein each one of the plurality of formats is associated with one of different requestors.

9. The method of claim 1, wherein as the level of access assigned to the requestor increases, the amount of information in the result set available to the requestor also increases.

10. The method of claim 1, wherein the level of access is associated with a condition that varies with time, said condition including a market activity level.

11. A non-transitory computer-readable storage medium carrying one or more sequences of instructions for securing access to data, which instructions, when executed by one or more processors, cause the one or more processors to carry out the steps of:

receiving a request from a requestor to access a plurality of data access services, said request associated with a service model, and said request including filter parameters wherein the service model provides a plurality of structured views of data in a format specific to the requestor, and wherein data returned to the requestor is mapped to one of the plurality of structured views associated with the requestor, and wherein the filter parameters accompany the request and determine the data included in a result set;

accessing an authorization policy upon receiving the request to identify which of the plurality of data access services are available to the requestor, wherein the authorization policy includes one or more rules that are used to permit access to the plurality of data access services based on the requestor;

accessing, based on the requestor, the plurality of data access services for which access is permitted by the authorization policy;

receiving a combined filtered result set, the combined result set including the results from accessing the plurality of data access services, wherein the results from each of the plurality of data access services is filtered based on the filter parameters, and wherein each portion of the combined filtered result set is assigned a minimum level of access required to access the portion;

determining a level of access assigned to the requestor;

inspecting the combined filtered result set and determining, for each portion of the combined filtered result set, whether the requestor is permitted to access said portion of the combined filtered result set by comparing the minimum level of access associated with each portion in the combined filtered result set with the requestor's level of access;

redacting said portion from the combined filtered result set if the requestor is not permitted by the level of access to access said portion of the combined filtered result set, wherein said redacting is performed after the combined filtered result set is received from the plurality of data access services;

retaining said portion within the combined filtered result set if the requestor is permitted to access said portion of the combined filtered result set based on the level of access assigned to the requestor;

presenting to the requestor at least one of the plurality of structured views of the combined filtered result set, wherein each portion that is not permitted to be accessed by the requestor is redacted from the result set, and wherein the at least one of the plurality of different views presented is based upon a determination of which of the plurality of data access services are relevant to the requestor.

12. The non-transitory computer-readable medium as recited in claim 11, wherein the instructions for carrying out the step of providing access to the result set include instructions for carrying out the steps of:

providing the result set according to access policies if the requestor is permitted by the access policies to access only a portion of the result set.

13. The non-transitory computer-readable medium as recited in claim 11, further comprising instructions, which when executed by the one or more processors cause the one or more processors to carry out the steps of:
   determining whether the requestor is making an authorized request to access datasets that the plurality of data access services access.

14. The non-transitory computer-readable medium as recited in claim 11, wherein service includes at least one of a network based application, a web server resident application, a web portal, a search engine, a photographic, audio or video information storage application, an e-Commerce application, a backup application, a storage application, a sales/revenue planning, marketing, forecasting, accounting, inventory management application.

15. The non-transitory computer-readable medium as recited in claim 11, further comprising instructions, which when executed by the one or more processors cause the one or more processors to carry out the steps of:
   determining a portion of the result set to be passed back to the requestor based on filter parameters accompanying with a request to access the plurality of data access services from the requestor.

16. The non-transitory computer-readable medium as recited in claim 11, further comprising instructions, which when executed by the one or more processors cause the one or more processors to carry out the steps of:
   reformatting queries to improve performance based on execution time, resource use, efficiency and other performance criteria.

17. The non-transitory computer-readable medium as recited in claim 11, further comprising instructions, which when executed by the one or more processors cause the one or more processors to carry out the steps of:
   comparing a security level associated with information in the result set received from the plurality of data access services and the requestor's permitted access policy security level.

18. The non-transitory computer-readable medium as recited in claim 11, further comprising instructions, which when executed by the one or more processors cause the one or more processors to carry out the steps of:
   mapping the result set into a special format suited for the requestor, wherein the special format is one of a plurality of formats, and wherein each one of the plurality of formats is associated with one of different requestors.

19. The non-transitory computer-readable medium as recited in claim 11, wherein as the level of access assigned to the requestor increases, the amount of information in the result set available to the requestor also increases.

20. The non-transitory computer-readable medium as recited in claim 11, wherein the level of access is associated with a condition that varies with time, said condition including a market activity level.

21. An apparatus for securing access to data, the apparatus comprising:
   a processor; and
   one or more stored sequences of instructions which, when executed by the processor, cause the processor to carry out the steps of:
   receiving a request from a requestor to access a plurality of data access services, said request associated with a service model, and said request including filter parameters wherein the service model provides a plurality of structured views of data in a format specific to the requestor, and wherein data returned to the requestor is mapped to one of the plurality of structured views associated with the requestor, and
      wherein the filter parameters accompany the request and determine the data included in a result set;
   accessing an authorization policy upon receiving the request to identify which of the plurality of data access services are available to the requestor, wherein the authorization policy includes one or more rules that are used to permit access to the plurality of data access services based on the requestor;
   accessing, based on the requestor, the plurality of data access services for which access is permitted by the authorization policy;
   receiving a combined filtered result set, the combined result set including the results from accessing the plurality of data access services, wherein the results from each of the plurality of data access services is filtered based on the filter parameters, and wherein each portion of the combined filtered result set is assigned a minimum level of access required to access the portion;
   determining a level of access assigned to the requestor;
   inspecting the combined filtered result set and determining, for each portion of the combined filtered result set, whether the requestor is permitted to access said portion of the combined filtered result set by comparing the minimum level of access associated with each portion in the combined filtered result set with the requestor's level of access;
   redacting said portion from the combined filtered result set if the requestor is not permitted by the level of access to access said portion of the combined filtered result set, wherein said redacting is performed after the combined filtered result set is received from the plurality of data access services;
   retaining said portion within the combined filtered result set if the requestor is permitted to access said portion of the combined filtered result set based on the level of access assigned to the requestor;
   presenting to the requestor at least one of the plurality of structured views of the combined filtered result set, wherein each portion that is not permitted to be accessed by the requestor is redacted from the result set, and wherein the at least one of the plurality of different views presented is based upon a determination of which of the plurality of data access services are relevant to the requestor.

\* \* \* \* \*

UNITED STATES PATENT AND TRADEMARK OFFICE
CERTIFICATE OF CORRECTION

| | | |
|---|---|---|
| PATENT NO. | : 8,086,615 B2 | Page 1 of 1 |
| APPLICATION NO. | : 11/341836 | |
| DATED | : December 27, 2011 | |
| INVENTOR(S) | : Patrick et al. | |

It is certified that error appears in the above-identified patent and that said Letters Patent is hereby corrected as shown below:

In the Drawings
On sheet 5 of 10, in figure 2C, Box No. 222, line 2, delete "permited" and insert -- permitted --, therefor.

Signed and Sealed this
Third Day of April, 2012

David J. Kappos
*Director of the United States Patent and Trademark Office*